United States Patent
Lenox

[19]

[11] Patent Number: 6,141,834
[45] Date of Patent: Nov. 7, 2000

[54] CLAMPING APPARATUS

[75] Inventor: Walter William Lenox, Lakewood, Colo.

[73] Assignee: A. J. Gerrard & Company, Des Plaines, Ill.

[21] Appl. No.: 09/312,532

[22] Filed: May 14, 1999

[51] Int. Cl.[7] ............................ B65D 63/06; F16L 47/00
[52] U.S. Cl. ...................... 24/23 W; 24/16 R; 24/23 R; 24/23 EE; 24/20 EE
[58] Field of Search ................. 24/23 W, 20 R, 24/20 W, 20 EE, 21, 23 EE, 16 R

[56] References Cited

U.S. PATENT DOCUMENTS

| Re. 14,763 | 11/1919 | Springer . | |
|---|---|---|---|
| 1,031,188 | 7/1912 | Law | 24/23 EE |
| 1,173,998 | 2/1916 | Depew | 24/23 W |
| 2,163,048 | 6/1939 | McKee | 24/23 W |
| 2,426,731 | 9/1947 | Elliott | 24/16 R |
| 3,078,532 | 2/1963 | Bywater . | |
| 3,833,969 | 9/1974 | Hollingsworth et al. | 24/23 W |
| 4,299,012 | 11/1981 | Oetiker . | |
| 4,308,648 | 1/1982 | Fay . | |
| 4,648,157 | 3/1987 | Irio et al. . | |
| 4,991,266 | 2/1991 | Oetiker . | |
| 5,033,167 | 7/1991 | Uchman | 24/20 EE |
| 5,430,912 | 7/1995 | Renzo et al. . | |
| 5,488,760 | 2/1996 | Jansen . | |
| 5,669,113 | 9/1997 | Fay . | |
| 5,766,218 | 6/1998 | Arnott . | |

*Primary Examiner*—Victor N. Sakran
*Attorney, Agent, or Firm*—Pauley Petersen Kinne & Fejer

[57] ABSTRACT

A clamping apparatus for a hose or another suitable tubular member. A coiled band forms an opening within which the hose or other tubular member is positioned. The coiled band forms an inner band, a middle band and a outer band. The middle band is sandwiched between the inner band and the outer band. A retainer is positioned about the inner band and the outer band, to retain the inner band, the middle and the outer band in a sandwiched position with respect to each other. Two or more projections extend radially inward, toward the opening formed by the coiled band, from the inner band. The projections interfere with the retainer to limit movement of the retainer in two directions, opposite to each other, along a longitudinal axis of the band.

19 Claims, 4 Drawing Sheets

CLAMPING APPARATUS

BACKGROUND OF THE INVENTION

1. FIELD OF THE INVENTION

This invention relates to a clamping apparatus, such as a hose clamp, having a coiled band and a retainer for keeping the coiled band in a coiled position, wherein projections projecting from an inner band of the coiled band limit movement of the retainer in a direction along a longitudinal axis of the band.

2. DESCRIPTION OF PRIOR ART

Conventional hose clamps have a coiled band and a buckle to keep the coiled band in a coiled position. The conventional coiled band can have one free end, also known to those skilled in the art as a locator, that transitions into an outer band at a location of the retainer. The conventional coiled band can have another end, opposite the free end, which typically transitions into an inner band of the coiled band. The coiled bands of many conventional hose clamps are pierced to form surface irregularities used to operate or tighten the hose clamp; however, pierced areas on the band create stress points or areas that significantly diminish the strength of materials and thus weaken the band.

In conventional hose clamps, the coiled band forms a generally circular but often irregular opening in which a hose is positioned. A conventional gripping tool is used to pull the free end of the band to decrease the diameter of the coil and thus tighten or compress the hose.

After the free end is pulled and the hose clamp is tightened, in conventional hose clamps the free end is bent radially outward to form a shoulder surface that locks against the buckle and thereby prevents the hose clamp from loosening.

In some conventional hose clamps, the buckle forms a shoulder with the inner band of the coil, typically on both sides of the buckle. When a hose is pressurized, the internal pressure can force the hose material radially outward into open shoulder regions and thereby form undesired leak paths, for example between layers of a composite hose.

It is apparent that there is a need for a durable hose clamp that has a simple construction and that can be easily produced. It is also apparent that there is a need for a hose clamp that has an internal periphery that eliminates shoulder regions or abrupt surface transitions and/or that farther approaches the shape of a circle, in an effort to eliminate undesired leak paths.

SUMMARY OF THE INVENTION

It is one object of this invention to provide a clamping apparatus that has a simple construction yet offers strength and durability.

It is another object of this invention to provide a clamping apparatus that has an internal periphery that avoids shoulder regions or abrupt surface transitions, particularly at or near edges of a retainer.

It is still another object of this invention to provide a clamping apparatus that uses projections from an inner band of a coiled band to provide a smooth transition of an internal periphery and to limit movement of the retainer in two opposing directions along a longitudinal axis of the coiled band.

It is yet another object of this invention to provide a clamping apparatus that has a clamping band with no pierced areas or regions.

The above and other objects of this invention are accomplished with a coiled band that forms an inner band, a middle band and an outer band. The middle band is preferably sandwiched between the inner band and the outer band. A retainer is positioned about or around and preferably surrounds a layered configuration of the inner band, the middle and the outer band. The retainer keeps the coiled band in a coiled position.

In one preferred embodiment according to this invention, at least two projections extend radially inward from the inner band. One projection is positioned on one side of the retainer and another projection is positioned on another side, such as an opposite side, of the retainer. Each projection preferably extends radially inward far enough so that the projection interferes with the retainer, such as an edge of the retainer, as the retainer moves toward the projection. When the retainer abuts the projection, the projection limits further movement of the retainer with respect to the band, in a direction toward the projection and generally parallel to a longitudinal axis of the coiled band.

In one preferred embodiment according to this invention, the projection forms a bearing surface that preferably establishes surface contact or line contact with a corresponding portion of the retainer. Thus, the projection preferably has a bearing surface that aligns with an edge or a side surface of the retainer. In one preferred embodiment according to this invention, in a plane generally parallel to an inner surface of the inner band, the projection has a generally triangular shape, with one leg of the generally triangular shape forming the bearing surface. In one preferred embodiment of this invention, the projection is formed by a dimple or another skin surface irregularity that does not pierce or perforate the band material.

The retainer is preferably but not necessarily formed as a clasp. The clasp can be constructed, for example, with a band that forms an open non-circular ring. The open-ring clasp can be positioned to surround the inner band, the middle band and the outer band. The open-ring clasp can then be compressed or otherwise forced together to tightly surround the layered arrangement of the inner band, the middle band and the outer band.

BRIEF DESCRIPTION OF THE DRAWINGS

The drawings show different features of a clamping apparatus, such as a hose clamp, accordingly to preferred embodiments of this invention, wherein.

DETAILED DESCRIPTION OF PREFERRED EMBODIMENTS

Clamping apparatus 10 according to this invention can be used as a hose clamp, particularly with hoses that operate at relatively high internal working pressures. For example, clamping apparatus 10 of this invention can be used with internal diameters of the clamp ranging from about ¾" to about 8". However, it is apparent that clamping apparatus 10 according to this invention can accomodate other smaller or larger sizes.

Figure 1:
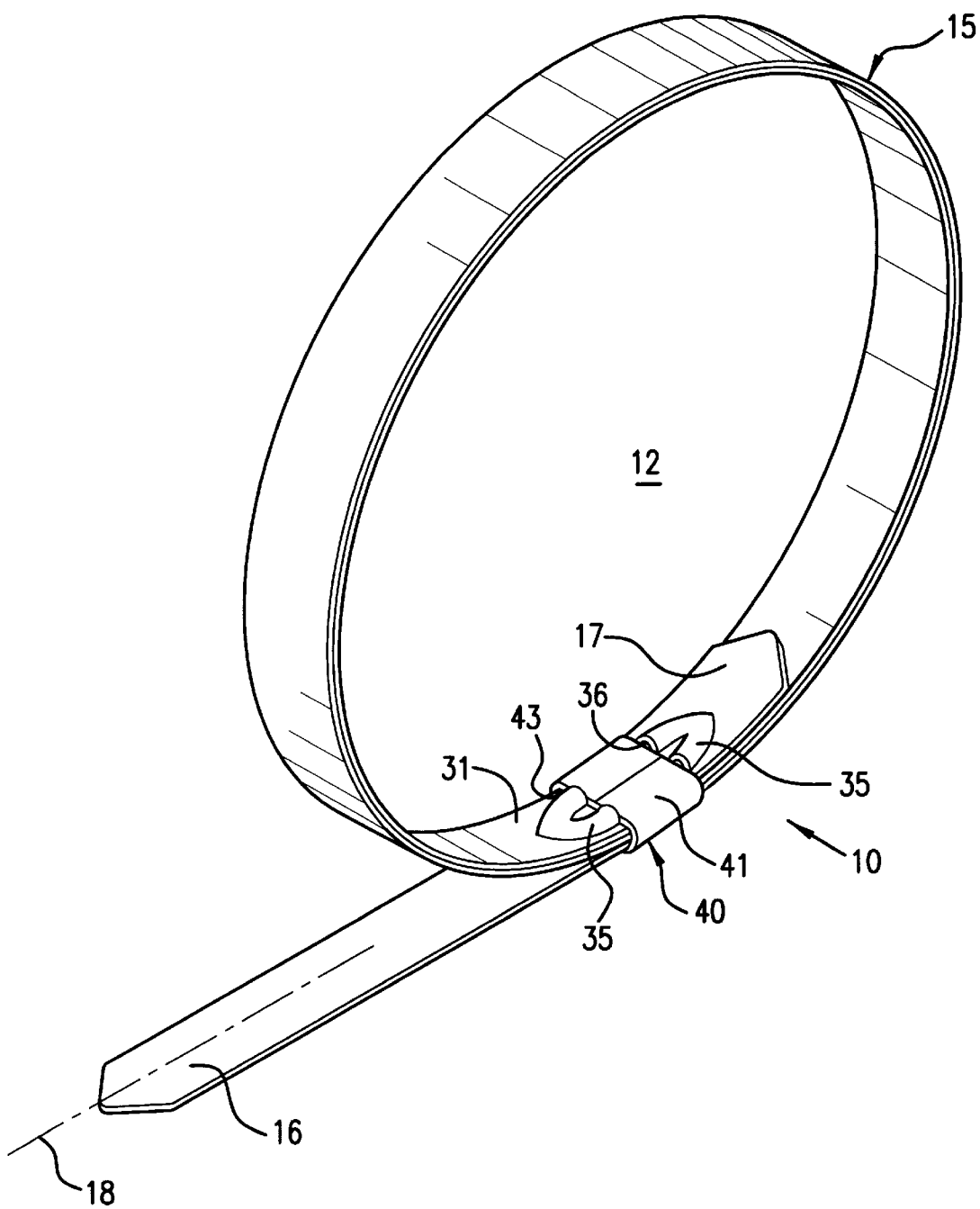
FIG. 1 is a perspective front view of a clamping apparatus, according to one preferred embodiment of this invention.
Figure 2:
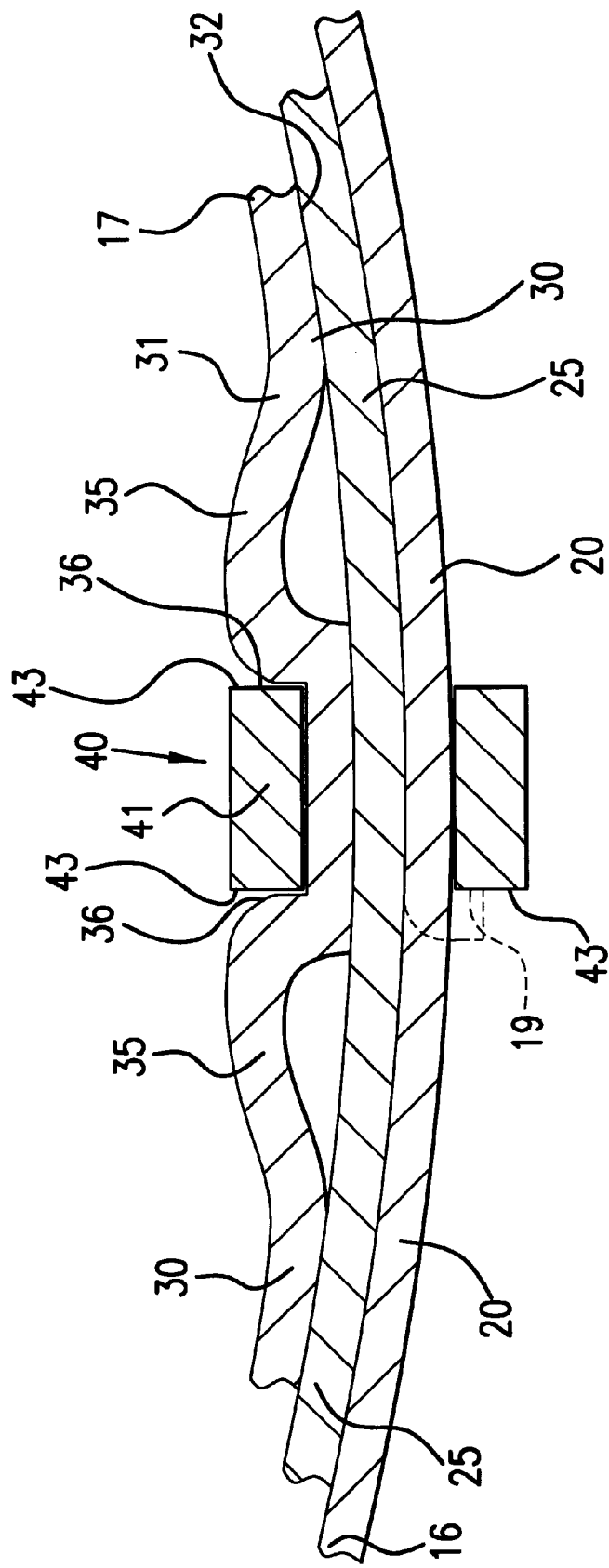
FIG. 2 is an enlarged partial cross-sectional view showing an inner band, a middle band and an outer band in a layered arrangement to form a coiled band, with a retainer that keeps the inner band, the middle band and the outer band in the layered arrangement, according to another preferred embodiment of this invention.

Clamping apparatus 10, according to preferred embodiments of this invention, comprises band 15 which forms at least one coil, preferably but not necessarily two or more coils. As shown in FIG. 1, band 15 forms two coils that define opening 12. Band 15 can be of different lengths to form different sizes of opening 12 that can accommodate a range of suitably sized hoses or other suitable tubular members. Once the hose or other suitable tubular member is positioned within opening 12, a conventional pulling tool can be attached to free end portion 16 of band 15. By pulling or otherwise forcing free end portion 16 away from coiled band 15, the inside diameter or area of coiled band 15 reduces and thus tightens or compresses the hose or other tubular member. Once the desired inside diameter or area of coiled band 15 is achieved, free end portion 16 can be bent downward, relative to the direction shown in FIG. 1, and cut off or otherwise severed to form shoulder 19 that is used to lock coiled band 15 in a tightened position. FIG. 2 shows shoulder 19 in dashed lines and locked against or abutting retainer edge 43 of retainer 19.

As shown in FIG. 2, coiled band 15 comprises two coils that form outer band 20, middle band 25 and inner band 30. As shown in FIG. 2, according to one preferred embodiment of this invention, middle band 25 is sandwiched between outer band 20 and inner band 30. As shown in FIGS. 1 and 2, outer band 20, middle band 25 and inner band 30 form a layered arrangement or configuration in the general region of retainer 40. As shown in FIGS. 1 and 2, retainer 40 keeps outer band 20, middle band 25 and inner band 30 in the layered arrangement or the sandwiched position. Retainer 40 can have a construction similar to conventional retainers, as known to those skilled in the art of hose clamps, which are used to keep a coiled band together. In one preferred embodiment of this invention, retainer 40 comprises a peripheral member that surrounds outer band 20, middle band 25 and inner band 30. The peripheral member may comprise clasp 41 that is positioned adjacent at least a portion of inner band 30, at least a portion of middle band 25 and at least a portion of outer band 20. As shown in FIG. 1, clasp 41 completely surrounds outer band 20, middle band 25 and inner band 30. However, it is apparent that any other suitable rigid retainer, such as a buckle or a tie, can be used to keep outer band 20, middle band 25 and inner band 30 in the layered arrangement.

In another preferred embodiment according to this invention, retainer 40 comprises a split ring, such as one constructed of band or strap material, as shown in FIGS. 1 and 2. The particular material, cross-sectional shape and dimensions of retainer 40 can be varied to accommodate different required holding strengths of clamping apparatus 10 of this invention. However configured, retainer 40 preferably has a thickness that forms a sufficient bearing surface, for reasons discussed throughout this specification.

Figure 3:
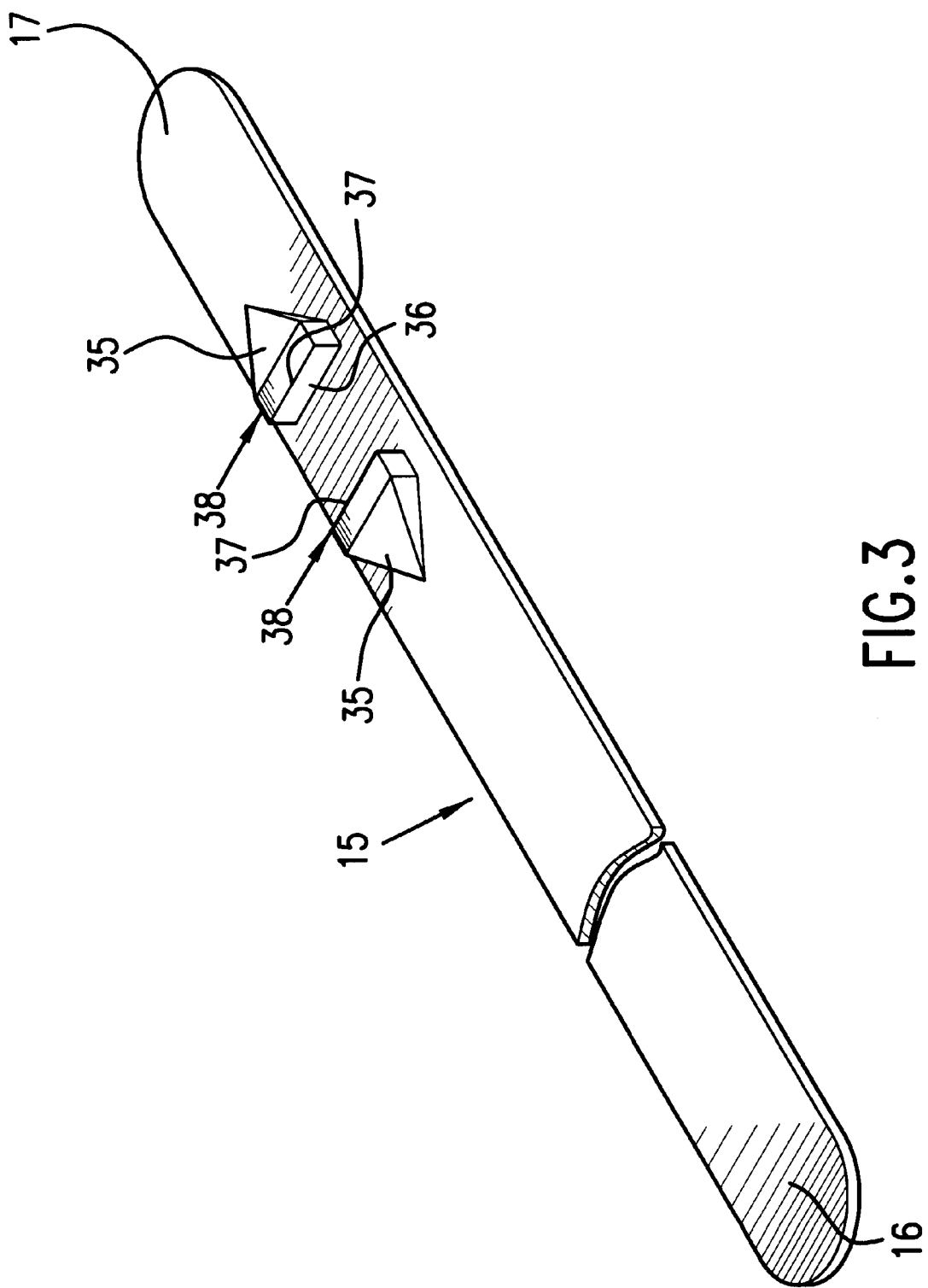
FIG. 3 is a partial perspective front view of two projections extending from an inner band of a coiled band, according to another preferred embodiment of this invention.

As shown in FIGS. 1–3, inner surface 31 of inner band 30 has or forms a plurality of projections 35. Each projection 35 is directed radially inward, as shown in FIG. 2, with respect to the coil formed by coiled band 15. FIGS. 1–3 show inner surface 31 having two projections 35, according to different preferred embodiments of this invention. FIG. 2 shows a cross-sectional view of projection 35, according to one preferred embodiment of this invention. As shown in FIGS. 2 and 3, no part of inner band 30 of band 15 is pierced at, near or in the vicinity of each projection 35, and thus no void is formed within band 35.

For a relatively smaller sized clamping apparatus 10 and thus smaller sized band 15, depending upon a magnitude of the required pulling force to adequately tighten clamping apparatus 10, it is relatively important that band 15, particularly at or near retainer 40, be non-perforated or have no voids formed by any piercing of band 15. Band 15 can be worked, whether pierced or not pierced, by any or more of different manufacturing processes, such as stamping, punching, rolling, cutting, drilling, burning, etching, and the like.

For a relatively larger sized clamping apparatus 10, which has a relatively larger and stronger band 15, it is less important than for a relatively smaller sized clamping apparatus 10, to have a non-perforated band 15, with no piercing. FIG. 1 shows projection 35 piercing inner band 30, directly below bearing surface 36 relative to the orientation of FIG. 1.

Projection 35 forms bearing surface 36. As shown in FIGS. 1 and 2, projection 35 extends far enough away from inner surface 31 to form a sufficiently sized and shaped bearing surface that can abut retainer 40. As shown in FIG. 2, the right retainer edge 43 abuts bearing surface 36 but the left retainer edge 43 does not abut bearing surface 36. In another preferred embodiment, the dimensions of retainer 40 are designed so that both retainer edges 43 simultaneously abut corresponding bearing surfaces 36. The selected or designed shape and dimensions of bearing surface 36 preferably establishes area contact or line contact between retainer 40 and projection 35. However, it is apparent that depending upon the particular strength or retaining force required by clamping apparatus 10, point contact established between bearing surface 36 and retainer edge 43 may even be sufficient.

In one preferred embodiment according to this invention, projection 35 has a triangular or approximately triangular two-dimensional shape within a plane that is generally parallel to inner surface 31, with band 15 in an uncoiled state. In such preferred embodiment, projection 35 is preferably shaped and positioned so that projection edge 37 of peripheral leg 38 is aligned with retainer edge 43 of retainer 40.

It is apparent that projection 35 can have any other suitable two-dimensional shape within the plane that is generally parallel to inner surface 31. For example, projection 35 can have a rectangular shape, a polygonal shape, a circular shape or any other suitable shape that forms a desired bearing surface 36. The triangular shape, particularly with peripheral leg 38 aligned with retainer edge 43 such as shown in FIGS. 1 and 3, more evenly distributes forces applied at bearing surface 36 through projection 35 and evenly across a width of band 36, more evenly than a rectangular shape. In certain uses that require relatively small tightening forces, the triangular shape may not be as necessary as in uses that require relatively large tightening forces.

With the pulling force more evenly distributed through band 15 because of the shape of projection 35 and/or the non-perforating or non-piercing of band 15, according to this invention, as compared to conventional hose clamps, clamping apparatus 10 of this invention better resists failure of band 15 and/or retainer 40. Many conventional hose clamps that have perforated bands will fail before clamping apparatus 10 of this invention will fail, given the same operating parameters and conditions.

In one preferred embodiment according to this invention, projection 35 can be formed as a dimple, circular or non-circular. As shown in FIG. 2, the dimple would project radially inward from inner surface 31. A suitable dimple can be formed by pressing a tool against outer surface 32 of inner band 30 or by any other stamping, machining or processing method known to those skilled in the art of forming metal or other materials. The dimple can be formed in any suitable shape, as previously discussed with respect to projection 35. Depending upon the particular application of clamping apparatus 10, the dimple-making process can either pierce or not pierce band 15.

In one preferred embodiment according to this invention, retainer 40 has limited movement along or in a general direction parallel to longitudinal axis 18 of band 15. FIG. 2 shows retainer 40 having enough space between each projection 35 so that retainer 40 can move along longitudinal axis 18. However, in another preferred embodiment according to this invention, projections 35 can be shaped so that as retainer 40 is clamped or otherwise tightened, retainer 40 presses against and thus deforms one or more projections 35. In such preferred embodiment of this invention, retainer 40 would have no movement along longitudinal axis 18, with respect to band 15.

Figure 4:
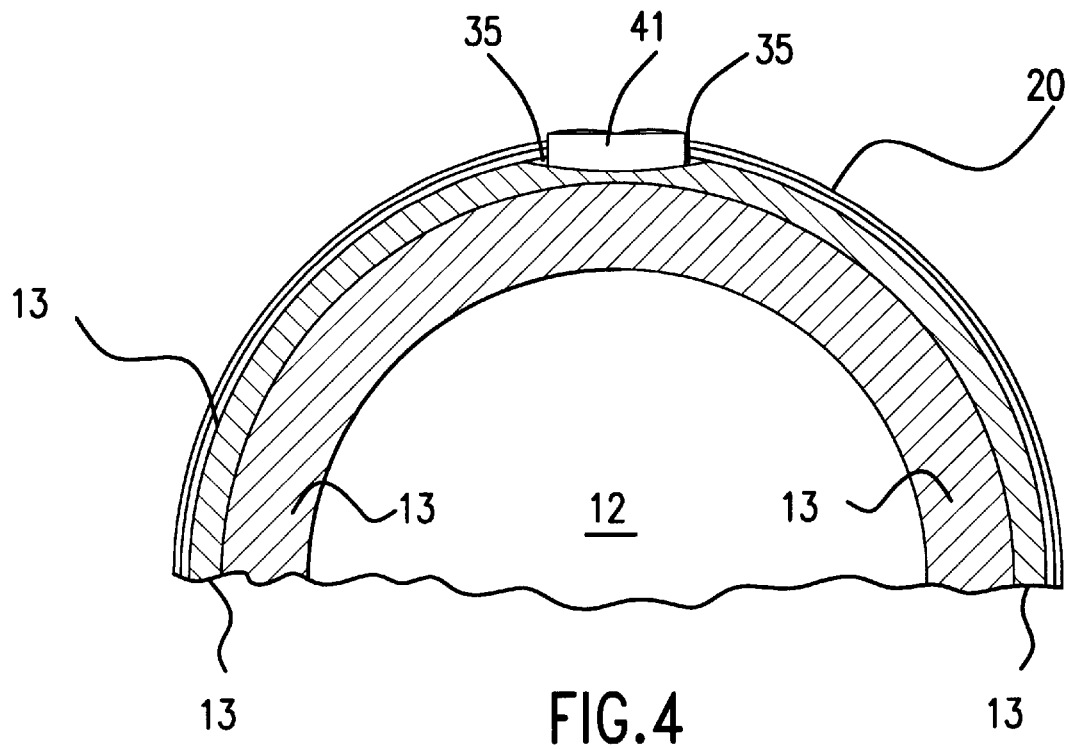
FIG. 4 is a schematic partial view of a clamping apparatus surrounding a composite hose, according to one preferred embodiment of this invention.
Figure 5:
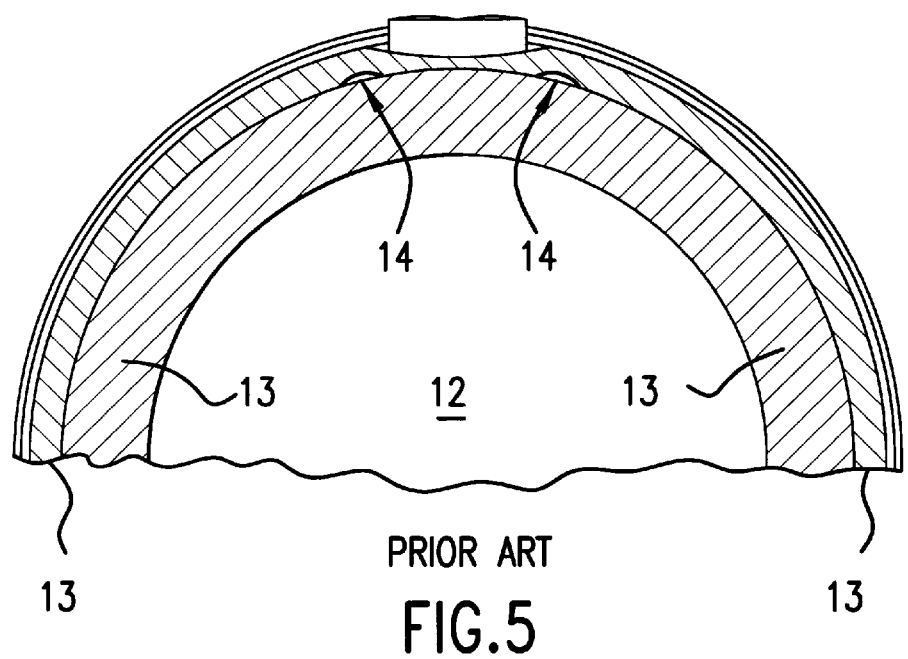
FIG. 5 is a schematic partial view of a hose clamp surrounding a composite hose, according to known prior art.

FIG. 4 shows a schematic view of clamping apparatus 10 with composite hose 13 mounted with opening 12 of coiled band 15. As shown in FIG. 4, clamping apparatus 10 of this invention maintains a shape of opening 12 that avoids abrupt transitions and/or that more closely approximates a circle than the conventional clamping apparatus as shown in FIG. 5. As shown in FIG. 4, clamping apparatus 10 of this invention eliminates voids formed by shoulder regions near retainer 40, and thus composite hose 13 does not form leak paths 14, as shown in FIG. 5.

The different elements of this invention can be constructed of steel, such as a suitable stainless steel, or of any other flexible and durable band or strap material, depending upon the particular application of clamping apparatus 10.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

I claim:

1. A clamping apparatus comprising:
    a coiled band forming an inner band, a middle band and an outer band;
    a retainer positioned adjacent said inner band and positioned adjacent said outer band; and
    an inner surface of said inner band having a plurality of projections each directed radially inward, each of said projections projecting far enough away from said inner surface to form a bearing surface that can abut said retainer, a first projection of said projections positioned on a first side of said retainer and a second projection of said projections positioned on a second side of said retainer.

2. A clamping apparatus according to claim 1 wherein said middle band is sandwiched between said inner band and said outer band.

3. A clamping apparatus according to claim 1 wherein near said projections said band is non-perforated.

4. A clamping apparatus according to claim 3 wherein said retainer comprises a clasp positioned adjacent at least a portion of each of said inner band, said middle band and said outer band.

5. A clamping apparatus according to claim 4 wherein said clasp surrounds said inner band, said middle band and said outer band.

6. A clamping apparatus according to claim 1 wherein said retainer is positioned with respect to said band to retain said inner band, said middle band and said outer band in a layered position with respect to each other.

7. A clamping apparatus according to claim 1 wherein said retainer surrounds said inner band, said middle band and said outer band.

8. A clamping apparatus according to claim 1 wherein said coiled band has at least one coil.

9. A clamping apparatus according to claim 1 wherein said band has two coils.

10. A clamping apparatus according to claim 1 wherein at least two of said projections each comprise a dimple in said inner band.

11. A clamping apparatus according to claim 1 wherein said projections have a generally triangular shape within a plane generally parallel to an inner surface of said inner band.

12. A clamping apparatus according to claim 1 wherein a peripheral leg of said generally triangular shape is aligned with an edge surface of said retainer.

13. A clamping apparatus according to claim 1 wherein said projections each form a projection edge that is aligned with a retainer edge surface of said retainer.

14. A clamping apparatus comprising:
    a coiled band forming an inner band, a middle band and an outer band;
    a retainer positioned adjacent said inner band and positioned adjacent said outer band;
    an inner surface of said inner band having a plurality of projections each directed radially inward, a first projection of said projections positioned on a first side of said retainer and a second projection of said projections positioned on a second side of said retainer; and
    at least two of said projections each comprising a dimple in said inner band, said dimple indented from a first surface of said inner band, said first surface facing radially outward, and said projection projecting radially inward beyond a second surface of said inner band, and said second surface being opposite said first surface.

15. A clamping apparatus comprising:
    a coiled band forming an inner band, a middle band and an outer band;
    a retainer positioned adjacent said inner band and positioned adjacent said outer band;
    an inner surface of said inner band having a plurality of projections each directed radially inward, a first projection of said projections positioned on a first side of said retainer and a second projection of said projections positioned on a second side of said retainer; and
    each of said projections having a bearing surface and extending radially inward far enough for said bearing surface to bear against said retainer when said retainer is moved toward said projection and for said bearing surface to prevent said retainer from moving beyond said projection.

16. A clamping apparatus according to claim 15 wherein said retainer has limited movement along a longitudinal axis of said band.

17. A clamping apparatus comprising:
    a coiled band forming an inner band, a middle band and an outer band;
    a retainer retaining said middle band in a sandwiched position between said inner band and said outer band; and an inner surface of said inner band having a plurality of projections each directed radially inward, each of said projections projecting far enough away from said inner surface to form a bearing surface that can abut said retainer, and said projections limiting movement of said retainer along a longitudinal axis of said band.

18. A clamping apparatus according to claim 17 wherein said projections prevent movement of said retainer in two directions along said longitudinal axis, and said two directions are opposite with respect to each other.

19. A clamping apparatus comprising:

a coiled band forming an inner band, a middle band and an outer band;

a retainer positioned about said inner band and said outer band and retaining said inner band, said middle band and said outer band in a sandwiched position with respect to each other; and a plurality of projections directed radially inward from said inner band, each of said projections projecting far enough away from said inner surface to form a bearing surface that can abut said retainer, and said projections interfering with said retainer to limit movement of said retainer in two directions opposite each other and along a longitudinal axis of said band.

\* \* \* \* \*